Nov. 13, 1934.     S. J. VOUCH     1,980,775
EXCITATION SYSTEM FOR DYNAMO ELECTRIC MACHINES
Filed Oct. 11, 1933
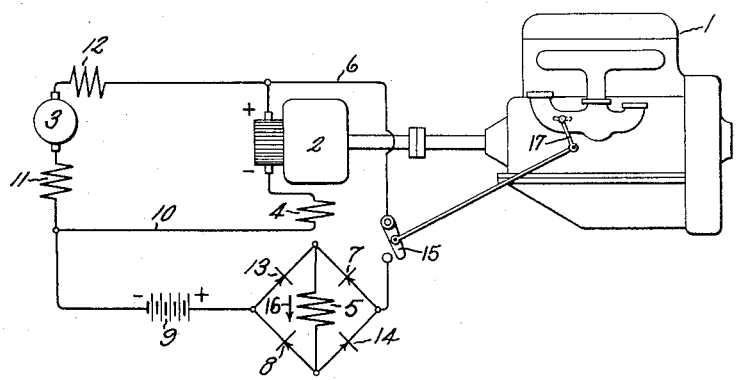
Inventor:
Stephen J. Vouch,
by Harry E. Dunham
His Attorney.

Patented Nov. 13, 1934

1,980,775

UNITED STATES PATENT OFFICE 1,980,775

EXCITATION SYSTEM FOR DYNAMO-ELECTRIC MACHINES

Stephen J. Vouch, Erie, Pa., assignor to General Electric Company, a corporation of New York Application October 11, 1933, Serial No. 693,124

5 Claims. (Cl. 172—239)

My invention relates to excitation systems for dynamo-electric machines of the type in which auxiliary excitation derived from a separate source of power, such as a battery, is used to increase the normal excitation of the dynamo-electric machine when the voltage of the dynamo-electric machine is less than a predetermined value. This type of excitation system is particularly adapted to electric drive equipment for motor vehicles since the added auxiliary excitation insures that the generator voltage will build up quickly and in the proper direction, so as to provide rapid acceleration of the vehicle. In an excitation system of this type, it is desirable to provide a simple arrangement for charging the battery which is used to provide the auxiliary excitation.

An object of my invention is to provide an excitation system having a simple circuit arrangement including asymmetrical conductors in which the entire current flowing through a field-exciting winding of the dynamo-electric machine during normal running conditions is used to charge the battery.

Further objects of my invention will become apparent as the following description proceeds, and the features of novelty which characterize my invention will be pointed out with particularity in the claims annexed to and forming a part of this specification.

The accompanying drawing is a diagrammatic representation of a power system including a generator having an excitation system embodying my invention.

In the form of my invention illustrated, I have shown an electric drive equipment for motor vehicles or the like in which a gasoline engine, or other prime mover, 1 is coupled to a generator 2 which supplies current to a driving motor 3 connected to the wheels of the vehicle. The generator is provided with a commutating field-exciting winding 4 and a shunt field-exciting winding 5. The motor is provided with a series field-exciting winding 11 and a commutating field-exciting winding 12. The generator shunt field-exciting winding 5 is connected across the midpoints of a bridge, each arm of which includes an asymmetric conductor or rectifier 7, 8, 13, and 14 respectively. Each rectifier permits current to flow in only one direction, as indicated by the arrow-heads, and the rectifiers are so arranged that the direction of current flow through the field winding is independent of the direction of the voltage across the ends of the bridge. In the excitation system illustrated, the voltage across the ends of the bridge is equal to the difference between the voltage from battery 9 and the voltage across the generator 2. Other sources of voltage may be used without affecting the operation of the bridge or changing the excitation of the field winding.

Since the generator voltage normally exceeds the battery voltage, the normal excitation current in the field winding 5 charges the battery 9 and flows from the generator 2 through a circuit which includes conductor 6, switch 15, rectifier or asymmetric conductor 7, shunt field winding 5, rectifier 8, battery 9, and conductor 10. When the generator voltage is less than the voltage of the battery, the auxiliary excitation current flows from the battery 9 through a circuit which includes rectifier 13, shunt field winding 5, rectifier 14, switch 15, conductor 6, generator 2, and conductor 10. The direction of the current flowing in winding 5 is the same whether the generator voltage is greater or less than the voltage of the battery and is indicated by the arrow 16 on the drawing.

A starting switch 15 is included in the circuit between one side of the generator 2 and an end of the bridge. This switch is interconnected with the throttle 17 of the prime mover in such a manner that when the switch is in the open position, the throttle is in the idling or closed position, and the throttle cannot be opened until the switch is closed.

For the purpose of describing the operation of the excitation system disclosed, assume that the driving motor 3 is at rest. Under this condition, the starting switch 15 will be open and the throttle 17 of the prime mover will be in the idling or closed position. To start the driving motor 3, the switch 15 is closed and the throttle 17 which is interconnected with this switch is moved to an open position. The closing of the switch 15 connects the ends of the bridge, including rectifiers 7, 8, 13, and 14, across the terminals of the generator 2 and in series with the battery 9. Under starting conditions, the voltage of the battery 9 exceeds that of the generator. The exciting current for the field winding 5 will, therefore, flow from the battery 9 through a circuit which includes rectifiers 13 and 14 so as to provide rapid acceleration of the vehicle. As the speed of the motor 3 increases, the generator voltage rises. When the generator voltage exceeds the battery voltage, the exciting current for field winding 5 flows from the generator and through a circuit which includes rectifiers 7 and 8 and battery 9 so as to charge the same. Under all conditions, the current flow in winding 5 is in the same direction as indicated by the arrow 16 in the drawing. When the exciting current flows from the generator, the entire exciting current is used to charge the battery.

Although I have shown my invention in connection with gas-electric drive equipment, it is obvious that my invention has general application to excitation systems for dynamo-electric machines.

What I claim as new and desire to secure by Letters Patent of the United States, is:

1. An excitation system for dynamo-electric machines including a field-exciting winding, a battery, another source of voltage, means dependent upon the voltage of said source being less than a predetermined value and including an asymmetrical conductor connected to said battery and said winding for providing auxiliary excitation of said winding by said battery, and means dependent upon the voltage of said source being greater than a predetermined value and including a second asymmetrical conductor connected to said battery and said winding for causing charging of said battery by the entire current flowing in said winding from said source of voltage.

2. An excitation system for dynamo-electric machines including a shunt-connected field-exciting winding and a battery, means dependent upon the voltage of said dynamo-electric machine being less than a predetermined value and including an asymmetrical conductor connected to said battery and said winding for providing auxiliary excitation of said winding by said battery, and means dependent upon the voltage of said dynamo-electric machine being greater than a predetermined value and including a second asymmetrical conductor connected to said battery and said winding for causing charging of said battery by the entire current flowing in said winding.

3. An excitation system for dynamo-electric machines including a field-exciting winding, a battery, another source of voltage, means dependent upon the voltage of said source being less than the voltage of said battery and including asymmetrical conductors connected at either end of said winding and connecting said battery in circuit with said winding and said source of voltage for providing auxiliary excitation of said winding by said battery, and means dependent upon the voltage of said source being greater than the voltage of said battery and including other asymmetrical conductors connected at either end of said winding and connecting said battery in circuit with said winding and said source of voltage for causing charging of said battery by said source of voltage.

4. An excitation system for dynamo-electric machines including a shunt-connected field-exciting winding and a battery, means dependent upon the voltage of said dynamo-electric machine being less than a predetermined value and including asymmetrical conductors connected at either end of said winding and connecting said battery in circuit with said winding and said dynamo-electric machine for providing auxiliary excitation of said winding by said battery, and means dependent upon the voltage of said dynamo-electric machine being greater than a predetermined value and including other asymmetrical conductors connected at either end of said winding and connecting said battery in circuit with said winding and said dynamo-electric machine for causing charging of said battery by the current flowing in said winding.

5. An excitation system for dynamo-electric machines including a shunt-connected field-exciting winding and a battery, means dependent upon the voltage of said dynamo-electric machine being less than a predetermined value and including a bridge formed of asymmetrical conductors connected at its ends in circuit with said battery and said dynamo-electric machine and at its midpoints to said winding for providing auxiliary excitation of said winding by said battery, and means dependent upon the voltage of said dynamo-electric machine being greater than a predetermined value and including said bridge for causing charging of said battery by the current flowing in said winding.

STEPHEN J. VOUCH.